United States Patent
Sharma et al.

(10) Patent No.: US 12,055,046 B2
(45) Date of Patent: Aug. 6, 2024

(54) CURVED BEAMS STACKED STRUCTURES-COMPLIANT SHROUDS

(71) Applicant: General Electric Company, Schenectady, NY (US)

(72) Inventors: Praveen Sharma, Bengaluru (IN); Ravindra Shankar Ganiger, Bengaluru (IN); Milind Chandrakant Dhabade, Bengaluru (IN)

(73) Assignee: General Electric Company, Cincinnati, OH (US)

(*) Notice: Subject to any disclaimer, the term of this patent is extended or adjusted under 35 U.S.C. 154(b) by 0 days.

(21) Appl. No.: 17/704,581

(22) Filed: Mar. 25, 2022

(65) Prior Publication Data

US 2023/0235679 A1    Jul. 27, 2023

(30) Foreign Application Priority Data

Jan. 24, 2022  (IN) .............................. 202211003884

(51) Int. Cl.
*F01D 11/12*   (2006.01)
*F01D 25/04*   (2006.01)

(52) U.S. Cl.
CPC ............ *F01D 11/127* (2013.01); *F01D 25/04* (2013.01); *F05D 2240/11* (2013.01);
(Continued)

(58) Field of Classification Search
CPC ...... F01D 11/12; F01D 11/125; F01D 11/127; F01D 11/16; F05D 2240/11; F05D 2250/711; F05D 2250/712; F05D 2260/96
See application file for complete search history.

(56) References Cited

U.S. PATENT DOCUMENTS

| 4,022,481 A | * | 5/1977 | Long | F16J 15/444 |
| | | | | 277/936 |
| 4,135,851 A | * | 1/1979 | Bill | F16J 15/441 |
| | | | | 415/173.3 |

(Continued)

FOREIGN PATENT DOCUMENTS

| FR | 3129432 | 5/2023 |
| WO | 2018140111 | 8/2018 |
| WO | 2018174739 | 9/2018 |

OTHER PUBLICATIONS

U.S. Appl. No. 10/941,673, filed May 10, 2010, Alfredo C Issa.
(Continued)

*Primary Examiner* — Brian P Wolcott
(74) *Attorney, Agent, or Firm* — Hanley, Flight & Zimmerman, LLC

(57) ABSTRACT

Curved beams stacked structures-compliant shrouds for gas turbine engines are disclosed. An example shroud assembly comprising a plurality of concave curved beams, a plurality of convex curved beams, and a plurality of bumpers, wherein a first concave curved beam of the plurality of concave curved beams is inversely coupled to a first convex curved beam of the plurality of convex curved beams, a second concave curved beam of the plurality of concave curved beams, inversely coupled to a second convex curved beam of the plurality of convex curved beams, the first and second concave curved beams configured to stack on top of the first and second convex curved beams, a first bumper of the plurality of bumpers coupled to the first and second concave curved beams, and a second bumper of the plurality of bumpers coupled to the first and second convex curved beams.

20 Claims, 10 Drawing Sheets

(52) U.S. Cl.
CPC .................. *F05D 2250/711* (2013.01); *F05D 2250/712* (2013.01); *F05D 2260/96* (2013.01)

(56) References Cited

U.S. PATENT DOCUMENTS

| | | | |
|---|---|---|---|
| 4,897,021 | A | 1/1990 | Chaplin et al. |
| 5,344,284 | A * | 9/1994 | Delvaux ................. F01D 11/22 415/173.2 |
| 7,189,057 | B2 * | 3/2007 | Lee ......................... F01D 11/16 415/128 |
| 8,475,118 | B2 | 7/2013 | Mulcaire et al. |
| 8,628,092 | B2 * | 1/2014 | Deo ....................... F16J 15/442 277/412 |
| 9,255,642 | B2 * | 2/2016 | Bidkar .................... F01D 11/04 |
| 9,587,746 | B2 * | 3/2017 | Bidkar ................... F01D 11/025 |
| 10,544,793 | B2 * | 1/2020 | Zatorski .................. F01D 11/16 |
| 10,731,497 | B2 | 8/2020 | DiFrancesco et al. |
| 10,822,972 | B2 * | 11/2020 | Mukherjee ............ F04D 29/526 |
| 10,830,081 | B2 * | 11/2020 | Chuong ................. F16J 15/442 |
| 11,111,805 | B2 | 9/2021 | McCaffrey et al. |
| 11,434,785 | B2 * | 9/2022 | Feldmann ............. F01D 11/001 |
| 11,499,448 | B2 * | 11/2022 | Yadav ................... F01D 25/005 |
| 2010/0034645 | A1 | 2/2010 | Mulcaire et al. |
| 2017/0159463 | A1 | 6/2017 | Mukherjee et al. |
| 2018/0209274 | A1 | 7/2018 | Zatorski et al. |
| 2019/0242266 | A1 | 8/2019 | DiFrancesco et al. |
| 2020/0165928 | A1 * | 5/2020 | McCaffrey ............ F01D 11/001 |
| 2020/0165929 | A1 | 5/2020 | McCaffrey et al. |
| 2022/0397038 | A1 * | 12/2022 | Ganiger ................ F01D 11/127 |

OTHER PUBLICATIONS

Bai et al., "Scantling of Ship's Hulls by Rules" 2016 retrieved from https://www.sciencedirect.com/topics/engineering/elastic-buckling-stress, 22 pages.
C.G. Johnson et al., "On the buckling of an elastic holey column", Nov. 15, 2017, https://royalsocietypublishing.org/doi/10.1098/rspa.2017.0477, 23 pages.
Https://www.sciencedirect.com/topics/earth-and-planetary-sciences/blade-tips.
Https://iopscience.iop.org/article/10.1088/1742-6596/555/1/012012/pdf.
Https://journals.sagepub.com/doi/full/10.1177/0020294019877514.

* cited by examiner

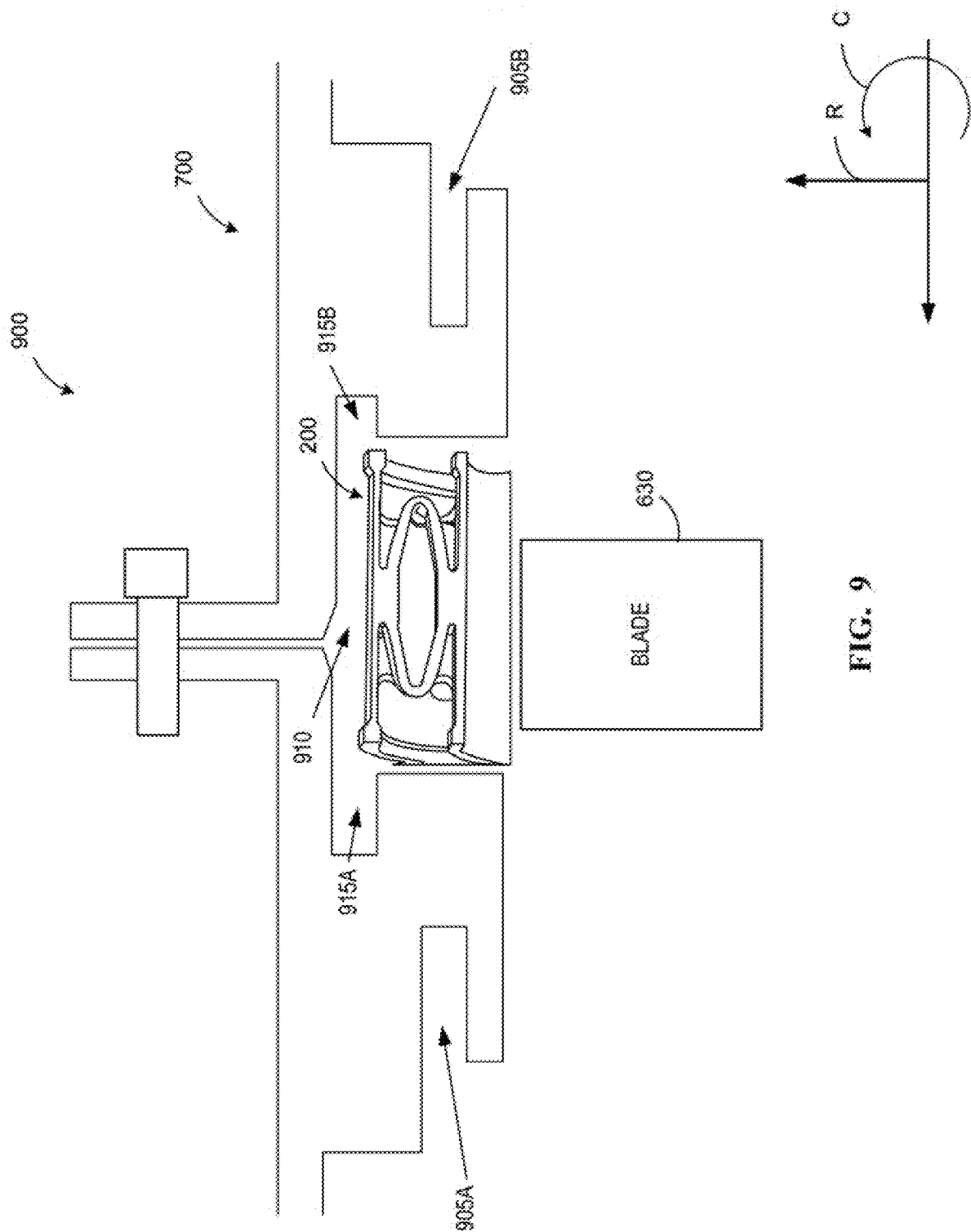

CURVED BEAMS STACKED STRUCTURES-COMPLIANT SHROUDS

CROSS-REFERENCE TO RELATED APPLICATION

This patent claims benefit to Indian Provisional Patent Application No. 2022/11003884, which was filed on Jan. 24, 2022, and which is hereby incorporated herein by reference in its entirety. Priority to Indian Provisional Patent Application No. 2022/11003884 filed with the Intellectual Property of India on Jan. 24, 2022, is hereby claimed.

FIELD OF THE DISCLOSURE

This disclosure relates generally to shroud assemblies for gas turbines, and, more particularly, to curved beams stacked structures-compliant shrouds.

BACKGROUND

In particular configurations, a compressor section of an engine includes, in serial flow order, a high pressure (HP) compressor and a low pressure (LP) compressor. Similarly, a turbine section of the engine includes, in serial flow order, a high pressure (HP) turbine and a low pressure (LP) turbine. The HP compressor, LP compressor, HP turbine, and LP turbine include a one or more axially spaced apart rows of circumferentially spaced apart rotor blades. Each rotor blade includes a rotor blade tip. One or more shrouds may be positioned radially outward from and circumferentially enclose the rotor blades.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 9 depicts an example curved beams stacked structures-compliant shroud assembly within the example compressor, including compressor casing slots for structure.

Figure 1:
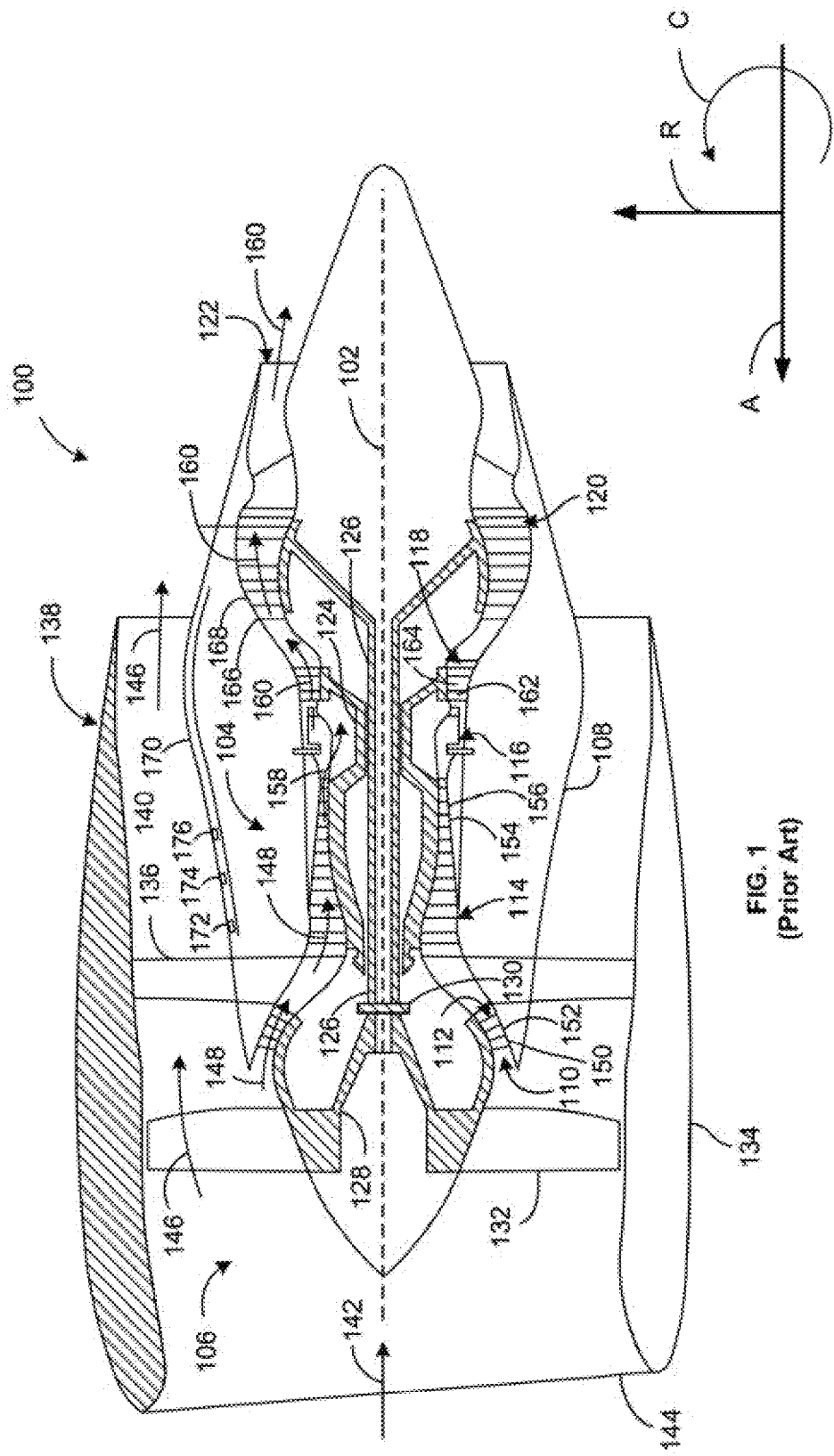
FIG. 1 illustrates a cross-sectional view of a prior gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known shroud assemblies for gas turbine engines provide a deflection response similar to that of a linear spring when a load is applied. Example shroud assemblies disclosed herein provide a structure stacked with curved beams inherently equipped with elastic buckling behavior. In some examples, the elastic buckling nature of the stacked curved beams allows for a soft rigidity when a blade rubs against the structure, causing the structure to conform with the shape of the airfoil as the blade makes contact. Additionally, example shroud assemblies disclosed herein include a series of bumpers along the stacked curves beams that engage with one another when a load is applied, increasing the stiffness of the shroud assembly and providing a further dampening effect.

Various terms are used herein to describe the orientation of features. As used herein, the orientation of features, forces and moments are described with reference to the yaw axis, pitch axis, and roll axis of the vehicle associated with the features, forces, and moments. In general, the attached figures are annotated with reference to the axial direction, radial direction, and circumferential direction of the gas turbine associated with the features, forces, and moments. In general, the attached figures are annotated with a set of axes including the roll axis R, the pitch axis P, and the yaw axis Y. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Many gas turbine engine architectures include shrouds positioned radially outward from and circumferentially enclosing the rotor blades of the engine. The proximity of the rotor blades to the shroud assemblies results in frequent physical contact between the blades and shrouds, causing eventual blade tip loss. Current approaches to avoiding and/or mitigating blade tip loss involve an increase in clearance between the blades and shrouds to provide a larger gap between the blade tip and shroud. However, this increase in clearance can contribute to a change in airflow within the turbine. For example, the larger clearance may cause a portion of the airflow through the turbine to flow away, thus decreasing the overall efficiency of the turbine and increasing the overall fuel consumption. Additionally, current shroud assemblies designed to mitigate blade tip loss involve linear spring mechanism to deflect radially inwards in response to blade tip contact. However, the degree of radially-inward deflection is limited and does not provide an air dampening and/or cushioning effect to allow for use as an active control mechanism for air flow in a compressor and/or turbine.

Examples disclosed herein overcome the above-referenced deficiencies via a set of curved beams stacked to form a shroud (referred to herein as a curved beams stacked structures-compliant shroud or as an adaptive stiffness compliant shroud). The curved beams stacked structures-compliant shroud, in examples disclosed herein, allows for an elastic buckling response to an application of force on the shroud. The importance of this elastic buckling response is observed, for example, to prevent blade tip loss when a rotor blade rubs against the shroud assembly. The use of bumpers, in conjunction with curved beams, allows for structural rigidity along with a measure of flexibility that mitigates blade tip loss and provides an effective dampening response.

Referring now to the drawings, wherein identical numerals indicate the same elements throughout the figures, FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172, 174, 176. The cowling 170 is a covering which may reduce drag and cool the engine. The offset-arch gimbals 172, 174, 176 may, for example, include infrared cameras to detect a thermal anomaly in the under-cowl area of the engine 100.

Figure 2A:
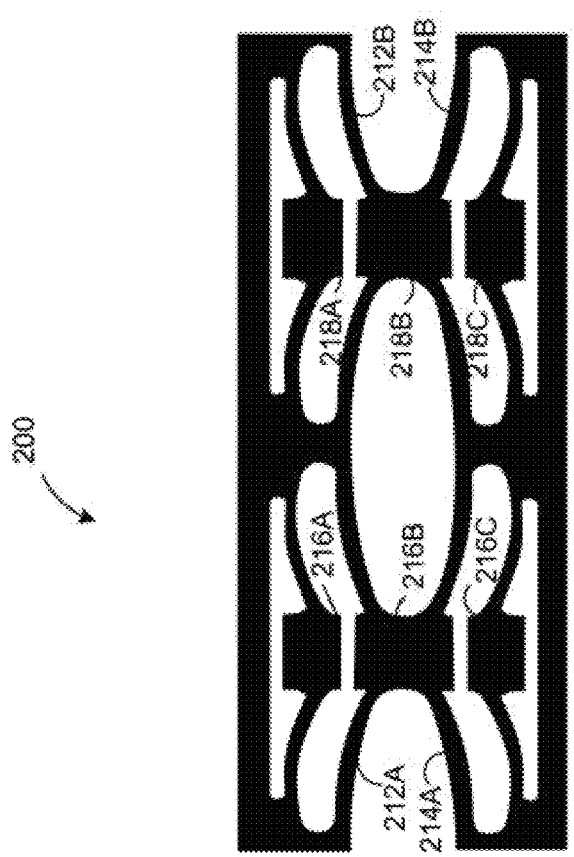
FIGS. 2A and 2B depict one-dimensional examples of curved beams stacked structures-compliant shrouds implemented in accordance with the teachings of this disclosure.

FIG. 2A depicts a one-dimensional example of curved beams stacked structures-compliant shroud 200 implemented in accordance with the teachings of this disclosure. The example shroud includes example concave curved beams 202A and 202B, inversely coupled to example convex curved beams 204A and 204B. The concave curved beams 202A, 202B and the convex curved beams 204A, 204B are stacked between beams 208A and 208B, with gaps (e.g., clearances) between the stacked structure allowing for the curved beams to move radially inward when a force is applied.

The example convex curved beams 204A and 204B elastically-buckle to a convex shape when enough force is applied, and the example convex curved beams 204A and 204B likewise elastically-buckle to a concave shape under the same conditions. The example curved beams stacked structures-compliant shroud 200 further includes an example set of edge bumpers 206A, 206B, and 206C. When enough force is applied near the external edges of the curved beams stacked structures-compliant shroud 200, causing the stacked beams to elastically buckle, the edge bumpers 206A, 206B, and 206C engage with one another to generate a stiffness to withstand the load. The example center bumpers 210A and 210B similarly engage when a force is applied near the center of beams 208A and/or 208B, and the engaged center bumpers 210A, 210B together provide rigidity to the curved beams stacked structures-compliant shroud 200. These proven hairpin-like structures of the convex and concave curved beams (202A, 202B and 204A, 204B) are stacked together in a hybrid arrangement to form the curved beams stacked structures-compliant shroud 200 using variable geometry and/or variable materials for assembly.

Figure 2B:
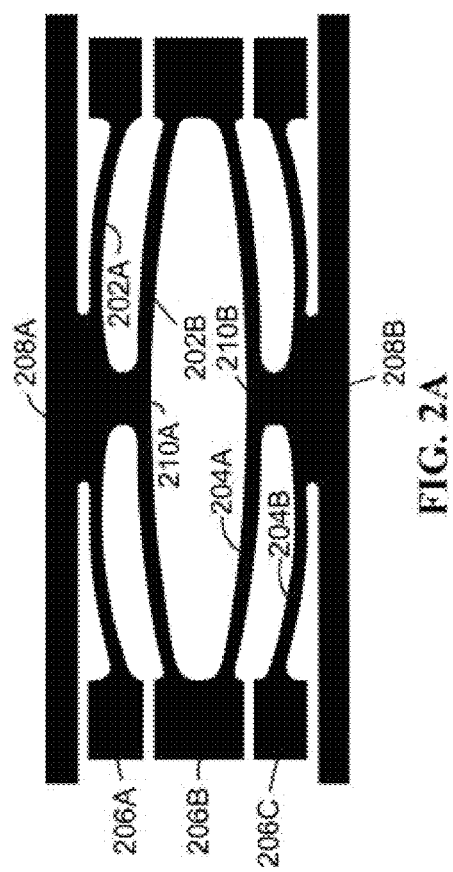

FIG. 2B illustrates another one-dimensional example of a curved beams stacked structures-compliant shroud 200 implemented in accordance with the teachings of this disclosure. Many of the components of the example of FIG. 2B are substantially similar or identical to the components described above in connection with FIG. 2A, however, the example of FIG. 2B shows a curved beams stacked structures-compliant shroud 200 containing left inner bumpers 216A, 216B, and 216C, as well as right inner bumpers 218A, 218B, and 218C. Additionally, the example curved beams stacked structures-compliant shroud 200 includes a set of concave edge curved beams 212A, 212B and a set of convex edge curved beams 214A, 214B.

The example curved beams stacked structures-compliant shroud 200, as illustrated in FIG. 2B, provides more rigidity (e.g., stiffness) than the example of FIG. 2A due to the inclusion of a greater number of bumpers along the curved beams stacked structures-compliant shroud 200. As such, in some examples, curved beams stacked structures-compliant shrouds may include fewer or greater numbers of bumpers, as well as various configurations of convex and concave curved beams to fit location-based or function-based load and/or dampening requirements. The adaptive stiffness of the shrouds is inherently achieved through multi ligament deformation and/or elastic buckling of the curved beams, and the shrouds allow for variable stiffness with respect to mission and event conditions.

Figure 3:
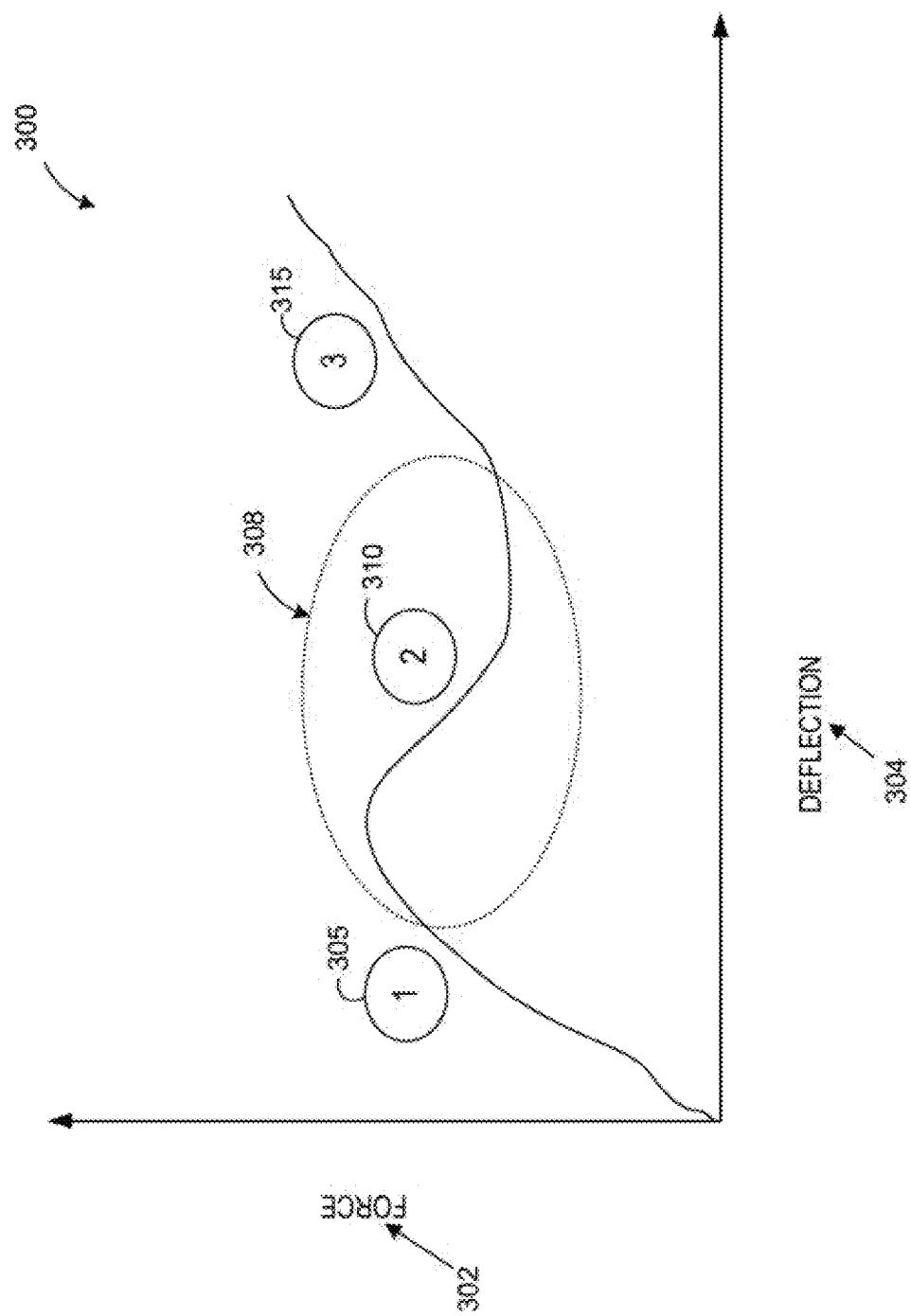
FIG. 3 illustrates an example graph of force versus deflection of an elastic buckling beam component of the curved beams stacked structures-compliant shrouds.

FIG. 3 illustrates a graph of an example force vs. deflection curve 300 showing force versus deflection for example curved beams stacked structures-compliant shrouds. The force vs. deflection curve 300 depicts a first, second, and third category of stiffness 305, 310, and 315, respectively, associated with the curved beams stacked structures-compliant shroud assembly to demonstrate deflection behavior of the associated example curved beams stacked structures-compliant shroud assemblies.

The example first category of stiffness 305 represents an arbitrary category of high-stiffness curved beams stacked structures-compliant shroud assemblies. Within this first category of stiffness 305, as the amount of curve force 302 applied on the shroud assembly increases, the observed deflection 304 of the shroud assembly increases almost linearly in response. In examples disclosed herein, the observed deflection 304 of the shroud assembly represents the degree to which the structure is displaced when a force is exerted upon it. Additionally, in examples disclosed herein, a shroud assembly including a lesser number of bumpers than the shrouds 200 of FIGS. 2A and 2B would fall under this first category of stiffness 305.

The example second category of stiffness 310 represents an arbitrary category of medium-stiffness curved beams stacked structures-compliant shroud assemblies. Within this second category of stiffness 310, the behavior of elastic buckling 308 (e.g., Euler buckling) is observed in the force vs. deflection curve 300. Elastic buckling behavior is desirable for curved beams stacked structures-compliant shroud because elastic bucking allows for a dynamic response (e.g., temporary physical deformation) to a curve force 302, while still retaining an ability to snap back to an original structure or arrangement of the beams in the shroud. In examples disclosed herein, the shrouds 200 of FIGS. 2A and 2B fall within this second category of stiffness 310. As demonstrated herein, various assemblies of the shrouds allow for variable stiffness with respect to mission and event conditions.

The example third category of stiffness 315 represents an arbitrary category of low-stiffness curved beams stacked structures-compliant shroud assemblies. Similar to the behavior observed within the example first category of stiffness 305, within the example third category of stiffness 315, as the amount of curve force 302 applied on the shroud assembly increases, the observed deflection 304 of the shroud assembly also increases seemingly at the same rate. In examples disclosed herein, a shroud assembly including a greater number of bumpers than the shrouds 200 of FIGS. 2A and 2B would fall under this third category of stiffness 315.

Figure 4:
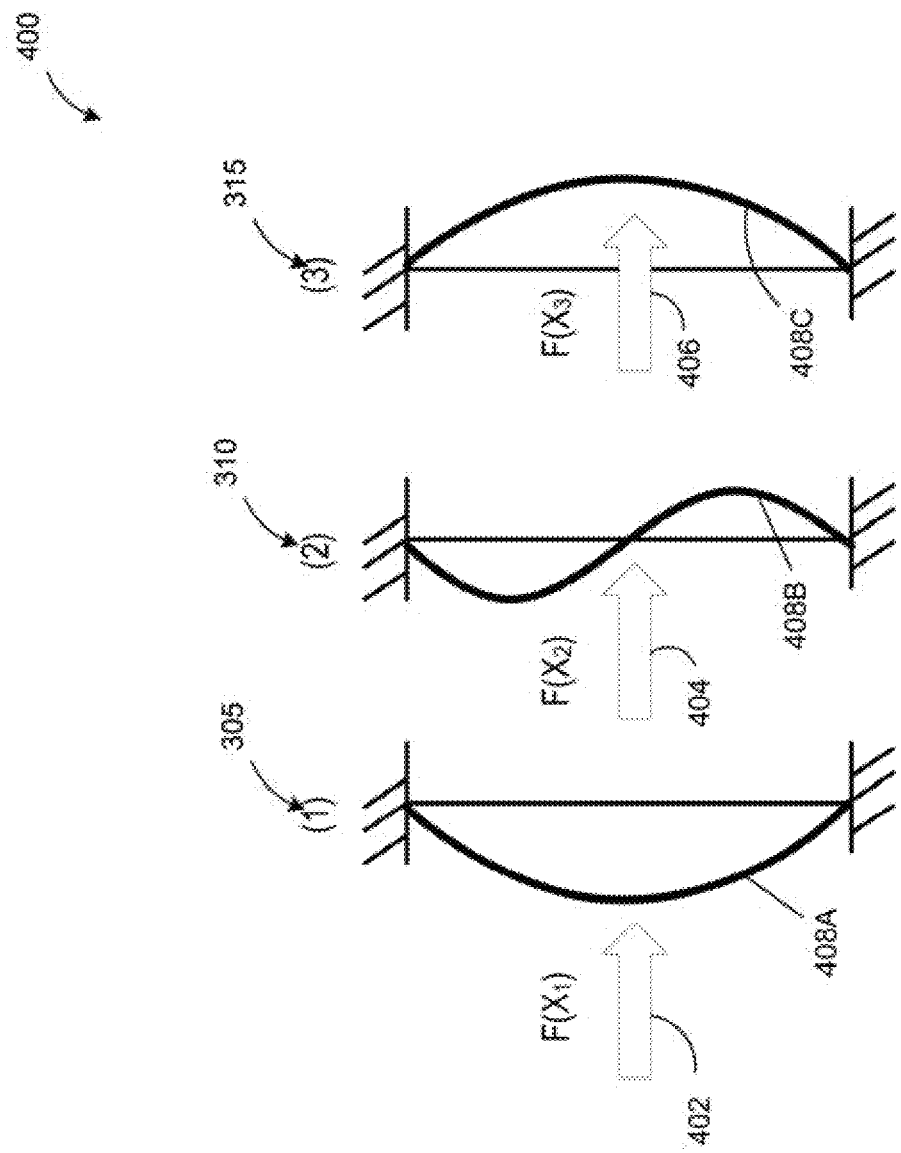
FIG. 4 is a depiction of an example deflection response of the curved beams stacked structures-compliant shrouds within different categories of stiffness.

FIG. 4 is a depiction of an example deflection response 400 of the curved beams stacked structures-compliant shroud 200 for each of the first, second, and third categories of stiffness 305, 310, and 315 of FIG. 3. Within the first category of stiffness 305, a first force 402 is applied to the first shroud assembly 408A with a high stiffness level. Due to the rigid nature of the first shroud assembly 408A, the illustration does not show much of a dynamic response to the first force 402. Within the second category of stiffness 310, a second force 404 is applied to the second shroud assembly 408B with a medium stiffness level. The deflection response for the second category of stiffness 310 shows an ideal elastic buckling response to the second force 404 applied to the second shroud assembly 408B. The example curved beams stacked structures-compliant shrouds 200 that fall within this category contain sequentially-contacting deflection limiters and deflecting ligaments to tune force-deflection behavior and provide an elastic buckling response.

Within the third category of stiffness 315, a third force 406 is applied to the third shroud assembly 408C with a low stiffness level. The deflection response for the third category of stiffness 315 shows a full buckling response to the third force 406 applied to the third shroud assembly 408C. The balance between rigidity and elasticity present in the third category of stiffness 315 provides structure to the shroud that allows for the withstanding of force, yet also creates an elastic buckling response to force that provides clearance from the blade to reduce impingement of the blade on the shroud. Such clearance reduces blade tip loss by reducing a likelihood that a blade tip contacts the shroud. The clearance also works in conjunction with the negative stiffness of the shrouds during rubs with the blades to further reduce blade tip loss.

Figure 5B:
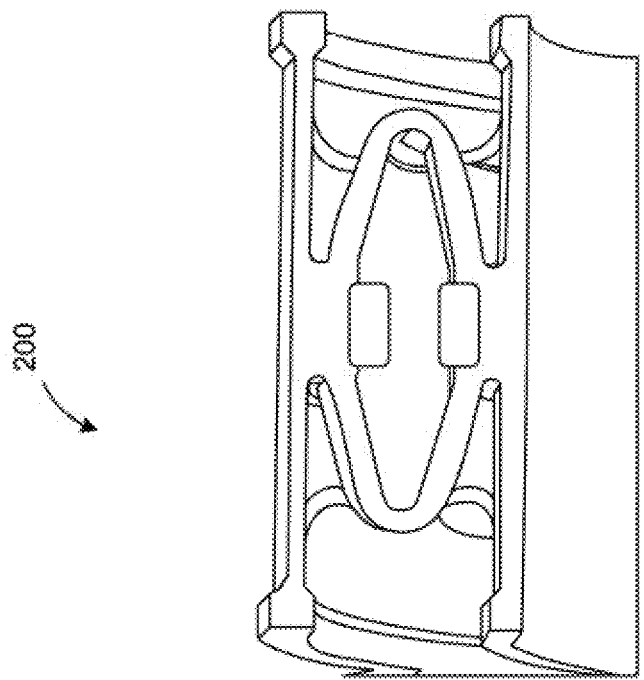
FIGS. 5A and 5B depict three-dimensional examples of curved beams stacked structures-compliant shrouds implemented in accordance with the teachings of this disclosure.
Figure 5A:
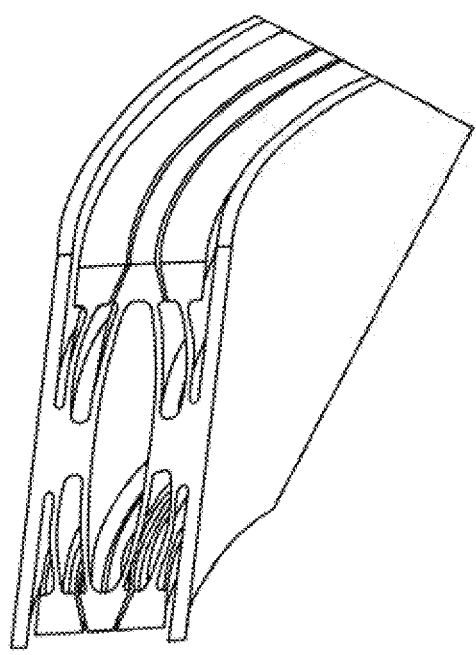

FIGS. 5A and 5B depict two-dimensional examples of the curved beams stacked structures-compliant shrouds 200 implemented in accordance with the teachings of this disclosure. Many of the components of the examples of FIGS. 5A and 5B are substantially similar or identical to the components described above in connection with FIGS. 2A and 2B, however, the examples of FIGS. 5A-5B differ in that they are 2-dimensional depictions. In examples disclosed herein, curved beams stacked structures-compliant shrouds can be implemented used a variety of high-temperature resistant materials, including, but not limited to, nickel alloys, super alloys, etc.

Figure 6:
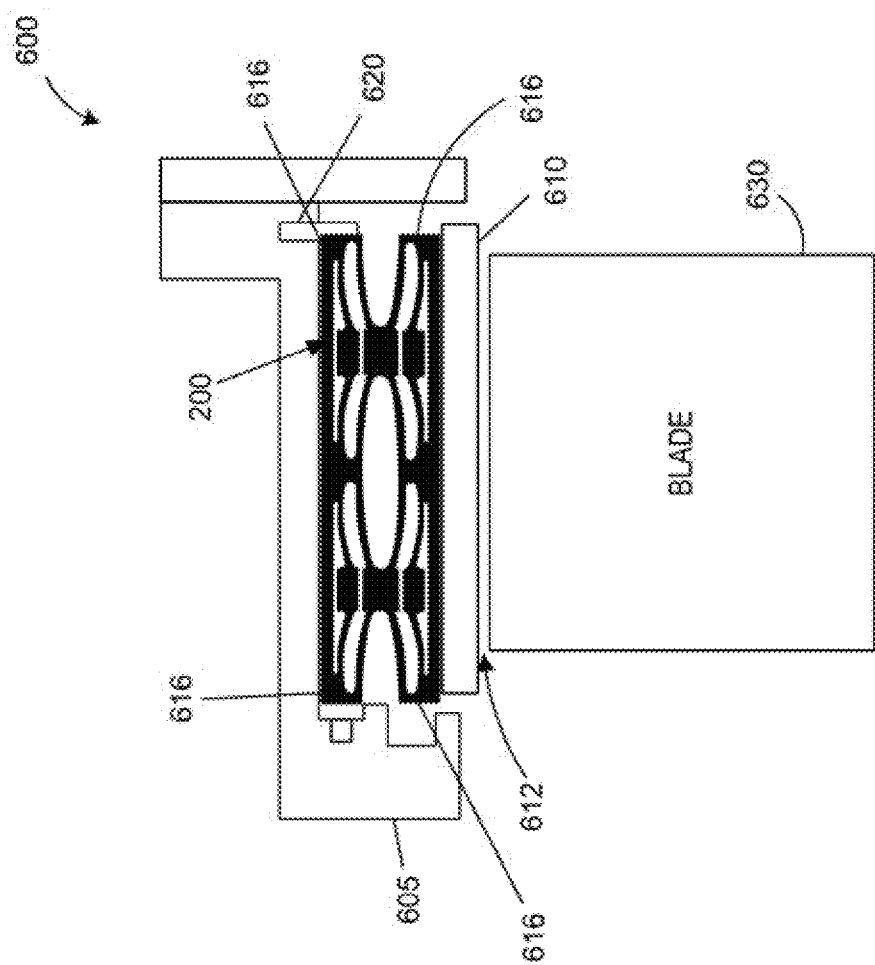
FIG. 6 is an illustration of an example curved beams stacked structures-compliant shroud assembly.

FIG. 6 is an illustration of an example curved beams stacked structures-compliant shroud assembly 600. The example shroud assembly 600 includes anti-rotation tabs 605, abradable material 610, a clearance 612, a curved beams stacked structures-compliant shroud 200, shroud arms 616, a retaining ring 620, and a blade 630. The example anti-rotation tabs 605 are fitted against the shroud arms 616 to prevent axial rotation of the curved beams stacked structures-compliant shroud 615 within the shroud assembly 600. The example retaining ring 620 further holds the curved beams stacked structures-compliant shroud 615 to prevent shifting and/or any other unwanted movement. The example blade 630 is a rotor blade. The example clearance 612 and example abradable material 610 (e.g., foil, ring, etc.) work in conjunction with the elastic buckling nature of the curved beams stacked structures-compliant shroud 615 to prevent blade damage and/or blade tip loss when the blade 630 comes into contact with the curved beams stacked structures-compliant shroud 615.

Figure 7:
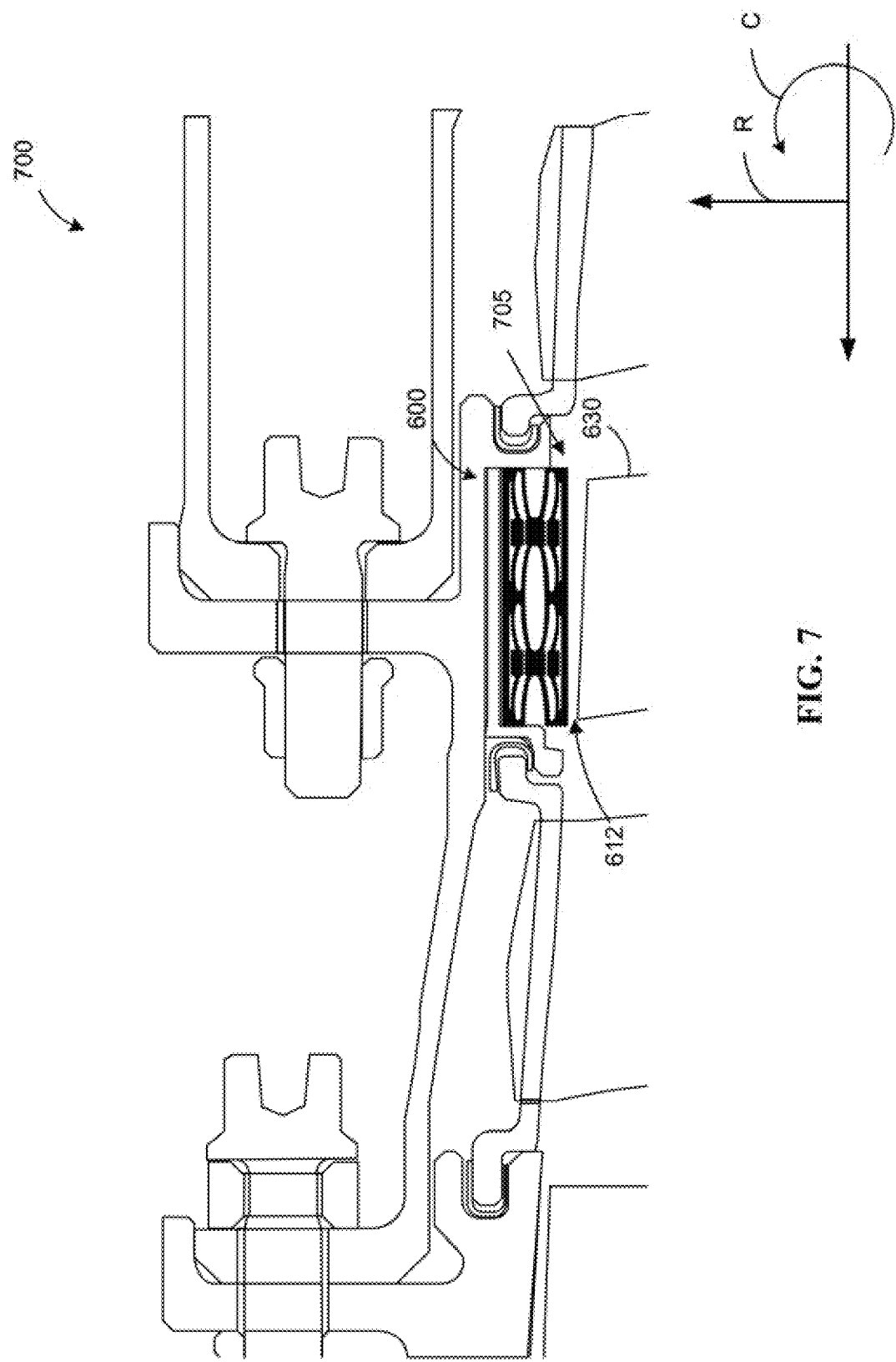
FIG. 7 is an illustration of an example curved beams stacked structures-compliant shroud assembly within an example compressor.

FIG. 7 is an illustration of the example shroud assembly 600 of FIG. 6 within an example portion of a compressor 700. The example clearance 612 creates a gap (e.g., clearance) between the shroud assembly 600 and blade 630 to further prevent blade damage during expansion and contraction of parts within the portion of a compressor 700. In examples disclosed herein, the example shroud assembly 600 is configured to sit within an example cavity 705 and deflect in response to force to act as an active control mechanism for external pressure (e.g., air pressure) and/or air flow.

Figure 8:
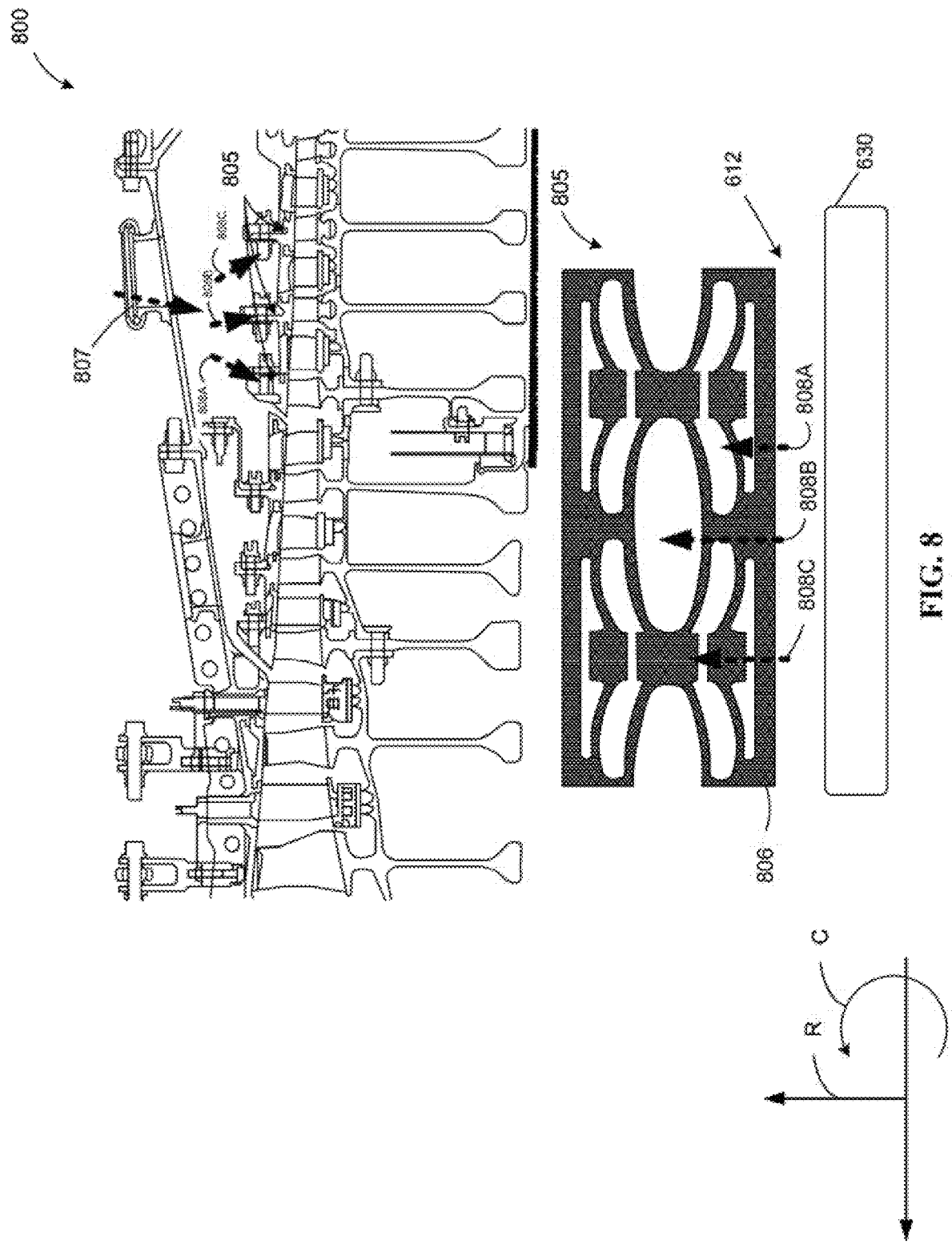
FIG. 8 depicts an example curved beams stacked-compliant shroud assembly within an existing compressor architecture to act as an active control system for the compressor.

FIG. 8 depicts an example shroud control mechanism 805 within a compressor 800 to act as an active control mechanism for air pressure and/or air flow. The shroud control mechanism 805 includes an example stacked shroud assembly 806 and a rotor blade 630. The clearance 612 between the stacked shroud assembly 806 and rotor blade 630 is designed to provide clearance to avoid blade rub during aircraft takeoff, with the clearance 612 closing once takeoff has been completed. When the aircraft reaches a cruising altitude, the pressure cavity manifold 807 within the compressor 800 is opened to allow air pressure 808A, 808B, 808C to enter the shroud control mechanism 805. As the air pressure 808A, 808B, 808C flows through the shroud control mechanism 805, the shroud control mechanism 805 moves radially inward to deflect the force of the pressure, providing a mechanical dampening and/or cushioning affect that acts as an active control mechanism for the compressor 800. The air cushioning effect and/or vibration dampening effect further achieved through passive flow of air pressure 808A, 808B, and 808C through air damping holes in the shroud control mechanism 805 without radially-inward movement of the shroud control mechanism 805 acts as a passive control mechanism for the compressor 800.

FIG. 9 depicts example curved beams stacked structures-compliant shroud compressor assembly 900 within the example portion of the compressor 700 from FIG. 7. The curved beams stacked structures-compliant shroud 200 is located on top of the blade 630, and the example curved beams stacked structures-compliant shroud compressor assembly 900 includes stator vane slots (e.g., fixed stator vane slots or stator vane sectors) 905A and 905B for air flow and structure within the portion of the compressor 700. In examples disclosed herein, the example curved beams stacked structures-compliant shroud compressor assembly 900 also includes a backing plate 910, which is coupled to the curved beams stacked structures-compliant shroud 200. The backing plate 910 interfaces with casing slots 915A, 915B in order to hold the curved beams stacked structures-compliant shroud 200 in place within the portion of the compressor 700.

Figure 10B:
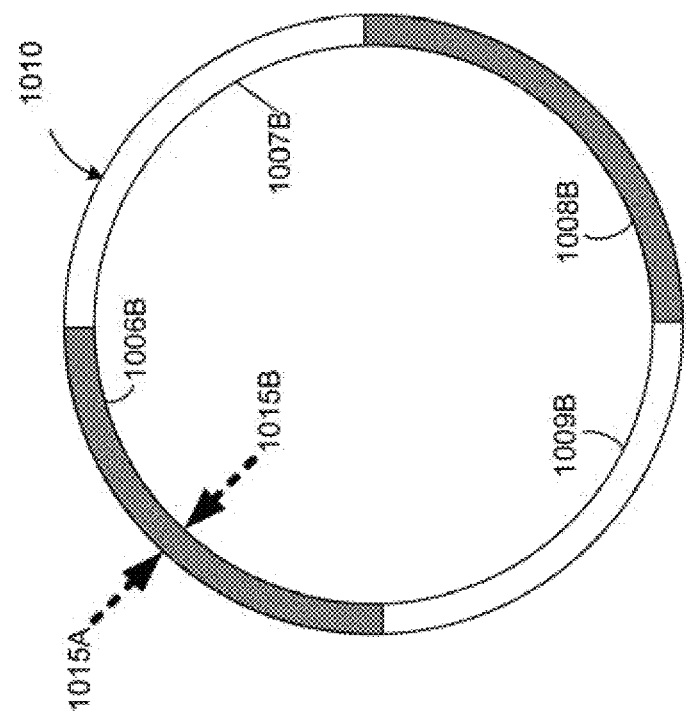
FIGS. 10A and 10B provide visualizations of a 360-degree circumferential hairpin damper shroud assembly and discrete sector hairpin damper shroud assembly as mechanisms for the attenuation of vibration.
Figure 10A:
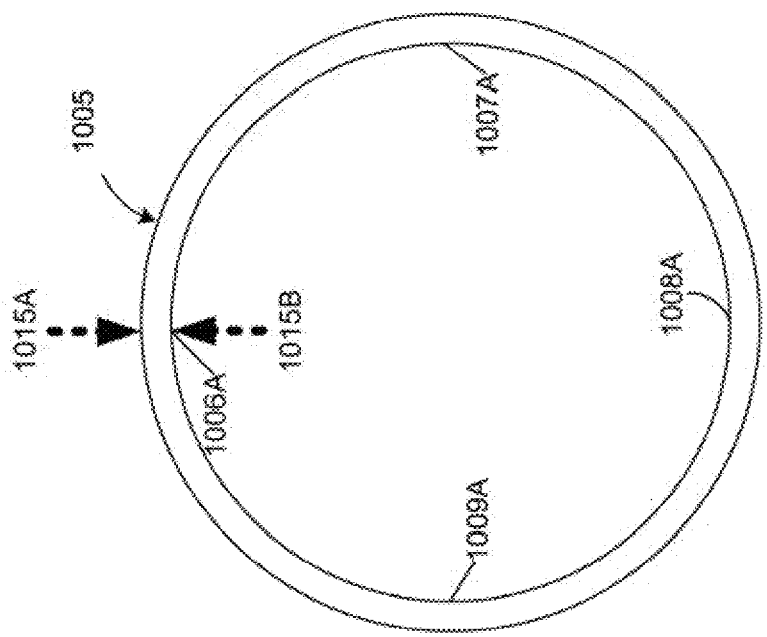

FIGS. 10A and 10B provide visualizations for an example 360-degree circumferential hairpin damper shroud assembly and an example discrete sector circumferential hairpin damper shroud assembly as mechanisms for the attenuation of vibration, respectively.

FIG. 10A is an example 360-degree shroud assembly 1005. The 360-degree shroud assembly 1005 depicts a type of assembly in which one continuous piece of material (e.g., a high-temperature resistant material, including, but not limited to, nickel alloys, super alloys, etc.) is used to form the shroud assembly 1005. In this single-piece configuration, a change initiated at one location on the shroud assembly 1005 produces a corresponding change at one more other locations on the shroud assembly 1005 since the shroud is a single, contiguous piece. For example, when an example inward force 1015A or outward force 1015B is applied at a first position 1006A of the 360-degree shroud assembly 1005, an adjustment in the shape of the 360-degree shroud assembly 1005 is produced not only at the desired first position 1006A but also at one or more other positions (e.g., second position 1007A, third position 1008A, and fourth position 1009A). Unintended movement caused by reaction to the inward force 1015A and/or outward force 1015B along the continuous shroud assembly 1005 may produce unintended effects such as a slight dampening effect, rubbing, etc.

FIG. 10B illustrates an example alternative implementation of the shroud assembly in which a plurality of discrete sections are used to form the example discrete shroud assembly 1010. Each section of the discrete shroud assembly 1010 is formed of a same or different material (e.g., a high-temperature resistant material, including, but not limited to, nickel alloys, super alloys, etc.). When an example inward force 1015A or outward force 1015B is applied in a first section or portion 1006B of the example discrete shroud assembly 1010, no corresponding movement is induced in other sections 1007B, 1008B, and/or 1009B because the sections are interconnected but separate and can flex or move independent of one another, unlike the 360-degree shroud assembly 1005 of FIG. 10A. For example, when the inward force 1015A or outward force 1015B is applied at the first section 1006B, other sections 1007B, 1008B, and/or 1009B may not experience any corresponding movement. Thus, the attenuated reaction along the discrete shroud assembly 1010 creates a stronger dampening effect than that of the 360-degree shroud assembly 1005 of FIG. 10A.

Certain examples provide a turbine shroud assembly including a means for deflecting a force. The means for deflecting a force can be implemented by the concave curved beams 202A, 202B, 208A, 208B, 212A, 212B (FIG. 2A) and/or the convex curved beams 204A, 204B, 214A, 214B (FIG. 2B), for example. The example means for deflecting a force deflects the force by buckling radially inward, for example. The example turbine shroud assembly also includes a means for providing stiffness in response to the force. The means for providing stiffness can be implemented by the bumpers 206A, 206B, 206C, 210A, 210B, 216A, 216B, 216C, 218A, 218B, 218C (FIGS. 2A-2B), for example.

Examples disclosed herein include curved beams stacked structures-compliant shrouds. The examples disclosed herein mitigate the rotor blade tip loss by employing an elastic buckling response to any force exerted on the shroud. Examples disclosed can reduce the cost of continual replacement of rotor blades of gas turbine engines and/or act as an active control system of a compressor by utilizing a dampening effect. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the present disclosure are provided by the subject matter of the following clauses:

Example 1 is a shroud assembly for a gas turbine engine comprising a plurality of concave curved beams, a plurality of convex curved beams, and a plurality of bumpers, wherein a first concave curved beam of the plurality of concave curved beams is inversely coupled to a first convex curved beam of the plurality of convex curved beams, and a second concave curved beam of the plurality of concave curved beams is inversely coupled to a second convex curved beam of the plurality of convex curved beams, the first and second concave curved beams configured to stack on top of the first and second convex curved beams, respectively, a first bumper of the plurality of bumpers is coupled to the first and second concave curved beams, and a second bumper of the plurality of bumpers is coupled to the first and second convex curved beams.

Example 2 is the shroud assembly of any preceding clause, wherein a clearance is formed between the first and second concave curved beams stacked on top of the first and second convex curved beams.

Example 3 is the shroud assembly of any preceding clause, wherein, when a load is applied, one or more of the first and second concave curved beams, the first and second convex curved beams, and the first and second bumpers of the plurality of bumpers are arranged to move radially inward.

Example 4 is the shroud assembly of any preceding clause, wherein the first and second bumpers of the plurality of bumpers are further configured to engage to resist radially inward movement when a load is applied.

Example 5 is the shroud assembly of any preceding clause, wherein adaptive stiffness of the shroud is inherently achieved through multi ligament deformation.

Example 6 is the shroud assembly of any preceding clause further designed to have a variable stiffness with respect to mission and event conditions.

Example 7 is the shroud assembly of any preceding clause, wherein the bumpers are sequentially-contacting deflection limiters, and the curved beams are deflecting ligaments.

Example 8 is the shroud assembly of any preceding clause, wherein the bumpers and curved beams tune force-deflection behavior.

Example 9 is the shroud assembly of any preceding clause, wherein air damping holes create an air cushioning effect wherein the shroud assembly is to deflect radially inwards in response to air flow to dampen vibrations.

Example 10 is shroud assembly of any preceding clause, wherein hairpin like structures, including at least the plurality of convex curved beams and the plurality of concave curved beans, are stacked together in a hybrid arrangement using variable geometry and variable materials.

Example 11 is a gas turbine comprising a compressor including a compressor casing and a plurality of compressor blades, the compressor casing defining first and second compressor casing slots, a turbine, comprising a turbine casing and a plurality of turbine blades, a shaft rotatably coupling the compressor and the turbine, and a shroud for at least one of the compressor or the turbine, the shroud comprising a first concave curved beam of a plurality of concave curved beams inversely coupled to a first convex curved beam of a plurality of convex curved beams, a second concave curved beam of a plurality of concave curved beams inversely coupled to a second convex curved beam of a plurality of convex curved beams, the first and second concave curved beams configured to stack on top of the first and second convex curved beams, a first bumper of a plurality of bumpers coupled to the first and second concave curved beams, and a second bumper of a plurality of bumpers coupled to the first and second convex curved beams.

Example 12 is the gas turbine of any preceding clause, wherein a clearance is formed between the first and second concave curved beams configured to stack on top of the first and second convex curved beams.

Example 13 is the gas turbine of any preceding clause, wherein when a load is applied, one or more of the first and second concave curved beams, the first and second convex curved beams, and the first and second bumpers of the plurality of bumpers move radially inward.

Example 14 is the gas turbine of any preceding clause, wherein the first and second bumpers of the plurality of bumpers are further configured to engage and prevent further radially inward movement when a sufficient load has been applied.

Example 15 is the gas turbine of any preceding clause, wherein adaptive stiffness of the shroud is achieved through multi ligament deformation.

Example 16 is the gas turbine of any preceding clause, wherein the shroud is arranged to have a variable stiffness with respect to mission and event conditions.

Example 17 is the gas turbine of any preceding clause, wherein the bumpers are sequentially-contacting deflection limiters, and the curved beams are deflecting ligaments.

Example 18 is the gas turbine of any preceding clause, wherein air damping holes create an air cushioning effect wherein the shroud assembly to deflect radially inwards in response to air flow to dampen vibrations.

Example 19 is the gas turbine of any preceding clause, wherein hairpin like structures, including at least the plurality of convex curved beams and the plurality of concave curved beams, are stacked together in a hybrid arrangement using variable geometry and variable materials.

Example 20 is a turbine shroud assembly comprising means for deflecting a force by buckling radially inwards, and means for providing stiffness in response to the force.

The following claims are hereby incorporated into this Detailed Description by this reference, with each claim standing on its own as a separate embodiment of the present disclosure.

What is claimed is:

1. A shroud assembly for a gas turbine engine comprising:
a plurality of concave curved beams;
a plurality of convex curved beams; and
a plurality of bumpers,
wherein:
a first concave curved beam of the plurality of concave curved beams is inversely coupled to a first convex curved beam of the plurality of convex curved beams, a first concavity of the first concave curved beam defined with respect to a first bumper of the plurality of bumpers coupled to the first concave curved beam, a first convexity of the first convex curved beam defined with respect to a second bumper of the plurality of bumpers coupled to the first convex curved beam,
a second concave curved beam of the plurality of concave curved beams is inversely coupled to a second convex curved beam of the plurality of convex curved beams, a second concavity of the second concave curved beam defined with respect to the first bumper coupled to the second concave curved beam, a second convexity of the second convex curved beam defined with respect to the second bumper coupled to the second convex curved beam,
the first and second concave curved beams are configured to stack on top of the first and second convex curved beams, respectively,
the first bumper of the plurality of bumpers is coupled to the first and second concave curved beams,
the second bumper of the plurality of bumpers is coupled to the first and second convex curved beams, and
the second bumper of the plurality of bumpers radially aligned in a stacked configuration with the first bumper of the plurality of bumpers to directly engage with the first bumper of the plurality of bumpers when a load is applied to the shroud assembly.

2. The shroud assembly of claim 1, wherein a clearance is formed between the first and second concave curved beams stacked on top of the first and second convex curved beams.

3. The shroud assembly of claim 1, wherein, when the load is applied, one or more of the first and second concave curved beams, the first and second convex curved beams, and the first and second bumpers of the plurality of bumpers are arranged to move radially inward.

4. The shroud assembly of claim 3, wherein the first and second bumpers of the plurality of bumpers are further configured to engage to resist radially inward movement when the load is applied.

5. The shroud assembly of claim 1, wherein an adaptive stiffness of the shroud assembly is inherently achieved through deformation of multiple beams.

6. The shroud assembly of claim 1 further designed to have a variable stiffness with respect to mission and event conditions.

7. The shroud assembly of claim 1, wherein the plurality of bumpers are sequentially-contacting deflection limiters, and the plurality of concave curved beams and the plurality of convex curved beams are deflecting ligaments.

8. The shroud assembly of claim 1, further including a plurality of air damping holes in a bottom beam of the shroud assembly create an air cushioning effect wherein the shroud assembly is to deflect radially inwards in response to air flow to dampen vibrations.

9. The shroud assembly of claim 1, wherein hairpin like structures, including at least the plurality of convex curved beams and the plurality of concave curved beams, are stacked together in a hybrid arrangement using variable geometry and variable materials.

10. A gas turbine comprising:
a compressor including a compressor casing and a plurality of compressor blades, the compressor casing defining first and second compressor casing slots;
a turbine, comprising a turbine casing and a plurality of turbine blades;
a shaft rotatably coupling the compressor and the turbine; and
a shroud for at least one of the compressor or the turbine, the shroud comprising:
  a first concave curved beam of a plurality of concave curved beams inversely coupled to a first convex curved beam of a plurality of convex curved beams, a first concavity of the first concave curved beam defined with respect to a first bumper of a plurality of bumpers coupled to the first concave curved beam, a first convexity of the first convex curved beam defined with respect to a second bumper of the plurality of bumpers coupled to the first convex curved beam;
  a second concave curved beam of the plurality of concave curved beams inversely coupled to a second convex curved beam of the plurality of convex curved beams, a second concavity of the second concave curved beam defined with respect to the first bumper coupled to the second concave curved beam, a second convexity of the second convex curved beam defined with respect to the second bumper coupled to the second convex curved beam;
  the first and second concave curved beams configured to stack on top of the first and second convex curved beams;
  the first bumper of the plurality of bumpers coupled to the first and second concave curved beams;
  the second bumper of the plurality of bumpers coupled to the first and second convex curved beams, wherein the second bumper of the plurality of bumpers is radially aligned in a stacked configuration with the first bumper of the plurality of bumpers to directly engage with the first bumper of the plurality of bumpers when a load is applied to the shroud.

11. The gas turbine of claim 10, wherein a clearance is formed between the first and second concave curved beams configured to stack on top of the first and second convex curved beams.

12. The gas turbine of claim 10, wherein when the load is applied, one or more of the first and second concave curved beams, the first and second convex curved beams, and the first and second bumpers of the plurality of bumpers move radially inward.

13. The gas turbine of claim 10, wherein the first and second bumpers of the plurality of bumpers are further configured to engage and prevent further radially inward movement when a sufficient load has been applied.

14. The gas turbine of claim 10, wherein an adaptive stiffness of the shroud is achieved through deformation of multiple beams.

15. The gas turbine of claim 10 wherein the shroud is arranged to have a variable stiffness with respect to mission and event conditions.

16. The gas turbine of claim 15, wherein the plurality of bumpers are sequentially-contacting deflection limiters, and the plurality of concave curved beams and the plurality of convex curved beams are deflecting ligaments.

17. The gas turbine of claim 10, further including a plurality of air damping holes in a bottom beam of the shroud to create an air cushioning affect wherein the shroud is to deflect radially inwards in response to air flow to dampen vibrations.

18. The gas turbine of claim 10, wherein hairpin like structures, including at least the plurality of convex curved beams and the plurality of concave curved beams, are stacked together in a hybrid arrangement using variable geometry and variable materials.

19. The shroud assembly of claim 1, wherein the coupling of the plurality of concave curved beams to the plurality of convex curved beams forms a 360-degree shroud assembly.

20. The gas turbine of claim 10, wherein the first concave curved beam of the plurality of concave curved beams, the second concave curved beam of the plurality of concave curved beams, the first convex curved beam of the plurality of convex curved beams, and the second convex curved beam of the plurality of convex curved beams form a 360-degree shroud assembly.

* * * * *